US012589746B2

(12) United States Patent (10) Patent No.: US 12,589,746 B2
Akahane et al. (45) Date of Patent: Mar. 31, 2026

(54) VEHICLE CONTROL DEVICE, STORAGE MEDIUM STORING COMPUTER PROGRAM FOR VEHICLE CONTROL, AND METHOD FOR CONTROLLING VEHICLE

(71) Applicant: TOYOTA JIDOSHA KABUSHIKI KAISHA, Toyota (JP)

(72) Inventors: Satoru Akahane, Yokohama (JP);
Terumoto Komori, Sunto-gun (JP);
Shimpei Kokubo, Sumida-ku (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 111 days.

(21) Appl. No.: 18/404,219

(22) Filed: Jan. 4, 2024

(65) Prior Publication Data

US 2024/0300496 A1 Sep. 12, 2024

(30) Foreign Application Priority Data

Mar. 10, 2023 (JP) ................................. 2023-037780

(51) Int. Cl.
*B60W 30/16* (2020.01)
(52) U.S. Cl.
CPC ..... *B60W 30/162* (2013.01); *B60W 2420/403* (2013.01); *B60W 2554/802* (2020.02); *B60W 2720/103* (2013.01)
(58) Field of Classification Search
CPC ......... B60W 30/162; B60W 2420/403; B60W 2554/802; B60W 2720/103; B60W 30/16; B60W 30/18163; B60R 1/081
See application file for complete search history.

(56) References Cited

U.S. PATENT DOCUMENTS

| | | | |
|---|---|---|---|
| 2017/0327094 A1 | 11/2017 | Inoue et al. | |
| 2019/0071081 A1* | 3/2019 | Katayama ....... | B60W 30/18163 |
| 2019/0118811 A1 | 4/2019 | Watanabe et al. | |
| 2020/0283024 A1* | 9/2020 | Iwasaki .............. | B60W 30/143 |
| 2021/0276484 A1* | 9/2021 | Kim ......................... | B60Q 9/00 |
| 2021/0394753 A1* | 12/2021 | Oh .................... | B60W 30/0956 |
| 2022/0250615 A1* | 8/2022 | Tanaka .................. | B60W 10/06 |

(Continued)

FOREIGN PATENT DOCUMENTS

| | | |
|---|---|---|
| JP | H03-251783 A | 11/1991 |
| JP | 2017-170973 A | 9/2017 |

(Continued)

*Primary Examiner* — Ashley L Redhead, Jr.
(74) *Attorney, Agent, or Firm* — OLIFF PLC.

(57) ABSTRACT

A vehicle control device has a processor configured to determine whether a host vehicle is located in a blind spot zone of another vehicle, to decide to change speed of the host vehicle in a predetermined direction to initiate movement control to cause movement of the host vehicle outside of the blind spot zone of another vehicle when it has been determined that the host vehicle is located in a blind spot zone of another vehicle, to determine whether an operation has been executed by the driver to change the speed of the host vehicle in the opposite direction to the predetermined direction based on information representing operation by a driver of the vehicle, while the movement control is being executed, and to end the movement control when it has been determined that the operation has been executed by the driver to change the speed of the host vehicle.

5 Claims, 7 Drawing Sheets

(56) References Cited

U.S. PATENT DOCUMENTS

| | | | |
|---|---|---|---|
| 2022/0396262 A1* | 12/2022 | Totzke | B60W 50/14 |
| 2023/0071338 A1* | 3/2023 | Johnson | G05D 1/0208 |
| 2023/0143937 A1* | 5/2023 | Wachi | G06N 3/006 |
| | | | 701/23 |
| 2023/0166773 A1* | 6/2023 | Wong | B60W 60/007 |
| 2023/0278588 A1* | 9/2023 | Sung | B60W 50/14 |
| 2023/0316927 A1* | 10/2023 | Kumavat | B60W 60/00256 |
| | | | 701/25 |
| 2024/0124011 A1* | 4/2024 | Alzuhd | B60W 50/14 |
| 2024/0199050 A1* | 6/2024 | Kuehner | B60W 60/0053 |
| 2024/0255645 A1* | 8/2024 | Keilaf | G01S 7/497 |

FOREIGN PATENT DOCUMENTS

| | | |
|---|---|---|
| JP | 2017-206039 A | 11/2017 |
| JP | 2010-95033 A | 4/2019 |
| JP | 2019073241 A | 5/2019 |

* cited by examiner

VEHICLE CONTROL DEVICE, STORAGE MEDIUM STORING COMPUTER PROGRAM FOR VEHICLE CONTROL, AND METHOD FOR CONTROLLING VEHICLE

FIELD

The present disclosure relates to a vehicle control device, a storage medium storing a computer program for vehicle control, and a method for controlling a vehicle.

BACKGROUND

An automatic control system mounted in a vehicle creates a navigation route for a host vehicle based on the current location of the vehicle, the destination location of the vehicle, and a navigation map. The automatic control system estimates the current location of the host vehicle using the map information and controls the vehicle to travel along the navigation route.

The automatic control system controls traveling of the vehicle so that a safe distance is maintained between the host vehicle and other vehicles. For example, the automatic control system controls the speed of the host vehicle so that a safe distance is maintained between the host vehicle and other vehicles.

When it has been determined that the host vehicle is located in a blind spot zone of another vehicle traveling in an adjacent lane, the automatic control system also controls the host vehicle by deceleration and acceleration to move from the blind spot zone to a location outside of the blind spot zone. The automatic control system thereby moves the host vehicle out of the blind spot zone where it is difficult for other vehicles to recognize it, for greater safety of the host vehicle (see Japanese Unexamined Patent Publication No. 03-251783, for example).

SUMMARY

The automatic control system may, for example, decelerate the host vehicle to move it from the blind spot zone of another vehicle to a location outside of the blind spot zone. However, when the driver desires to move out in front of the other vehicle, they may feel uncomfortable if the speed of their own vehicle is controlled, and may take action to accelerate instead, against speed control by the automatic control system.

In such cases, it has been problematic when the automatic control system continues to conduct speed control for movement out of the blind spot zone, while the driver is attempting to change the speed in a manner opposite from speed control of the host vehicle by the automatic control system.

It is an object of the present disclosure to provide a vehicle control device that reduces discomfort felt by the driver with speed control of their own vehicle, when enacting movement control to move the host vehicle from the blind spot zone of another vehicle to a location outside of the blind spot zone.

(1) One embodiment of the invention provides a vehicle control device. The vehicle control device has a processor configured to determine whether or not a host vehicle is located in a blind spot zone of another vehicle based on information representing environment surrounding the host vehicle, decide to change speed of the host vehicle in a predetermined direction to initiate movement control to cause movement of the host vehicle from the blind spot zone of another vehicle to a location outside of the blind spot zone when it has been determined that the host vehicle is located in the blind spot zone of another vehicle, determine whether or not an operation has been executed by the driver to change the speed of the host vehicle in the opposite direction to the predetermined direction based on information representing operation by a driver of the vehicle, while the movement control is being executed after its initiation has been decided, and end the movement control when it has been determined that the operation has been executed by the driver to change the speed of the host vehicle.

(2) In the vehicle control device of (1) above, it is preferable that the processor is further configured to determine whether or not a predetermined intervehicular distance can be maintained between the host vehicle and a second other vehicle traveling in the traffic lane in which the host vehicle is traveling after the speed of the host vehicle has been changed by driver operation to move the host vehicle from the blind spot zone of the other vehicle to a location outside of the blind spot zone when it has been determined that the operation has been executed by the driver to change the speed of the host vehicle, and decide to continue without ending the movement control when it has been determined that the predetermined intervehicular distance between the host vehicle and the second other vehicle cannot be maintained.

(3) In the vehicle control device of (1) or (2) above, it is preferable that the processor is further configured to determine that the operation to change the speed of the host vehicle has been executed by the driver when an operation to set the speed of the host vehicle has been executed by the driver in the opposite direction to the predetermined direction.

(4) In the vehicle control device of (3) above, it is preferable that the processor is further configured to determine that the operation to change the speed of the host vehicle has been executed by the driver when the driver grips a steering wheel or looks at a speed display unit, and an operation to set the speed of the host vehicle has been executed by the driver in the opposite direction to the predetermined direction.

(5) According to another embodiment, a non-transitory storage medium storing a computer program for vehicle control is provided. The computer program for vehicle control causes a processor to execute a process and the process includes determining whether or not a host vehicle is located in a blind spot zone of another vehicle based on information representing environment surrounding the host vehicle, deciding to change speed of the host vehicle in a predetermined direction to initiate movement control to cause movement of the host vehicle from the blind spot zone of another vehicle to a location outside of the blind spot zone when it has been determined that the host vehicle is located in the blind spot zone of another vehicle, determining whether or not an operation has been executed by the driver to change the speed of the host vehicle in the opposite direction to the predetermined direction based on information representing operation by a driver of the vehicle, while the movement control is being executed, and ending the movement control when it has been determined that the operation has been executed by the driver to change the speed of the host vehicle.

(6) Another embodiment of the invention provides a method for controlling a vehicle. The method for controlling a vehicle is carried out by a vehicle control device and includes determining whether or not a host vehicle is located in a blind spot zone of another vehicle based on information representing environment surrounding the host vehicle, deciding to change speed of the host vehicle in a predetermined direction to initiate movement control to cause movement of the host vehicle from the blind spot zone of another vehicle to a location outside of the blind spot zone when it has been determined that the host vehicle is located in the blind spot zone of another vehicle, determining whether or not an operation has been executed by a driver to change the speed of the host vehicle in the opposite direction to the predetermined direction based on information representing operation by the driver of the vehicle, while the movement control is being executed, and ending the movement control when it has been determined that the operation has been executed by the driver to change the speed of the host vehicle.

The vehicle control device of the present disclosure ends movement control after the movement control has been initiated to move the host vehicle out of a blind spot zone of another vehicle by changing the speed of the host vehicle, when an operation to change the speed of the host vehicle in an opposite manner has been executed by the driver, and it can therefore reduce discomfort experienced by the driver with speed control of their own vehicle.

The object and advantages of the invention will be realized and attained by means of the elements and combinations particularly indicated in the claims. It is to be understood that both the foregoing general description and the following detailed description are exemplary and explanatory and are not restrictive of the invention, as claimed.

DESCRIPTION OF EMBODIMENTS

Figure 1A:
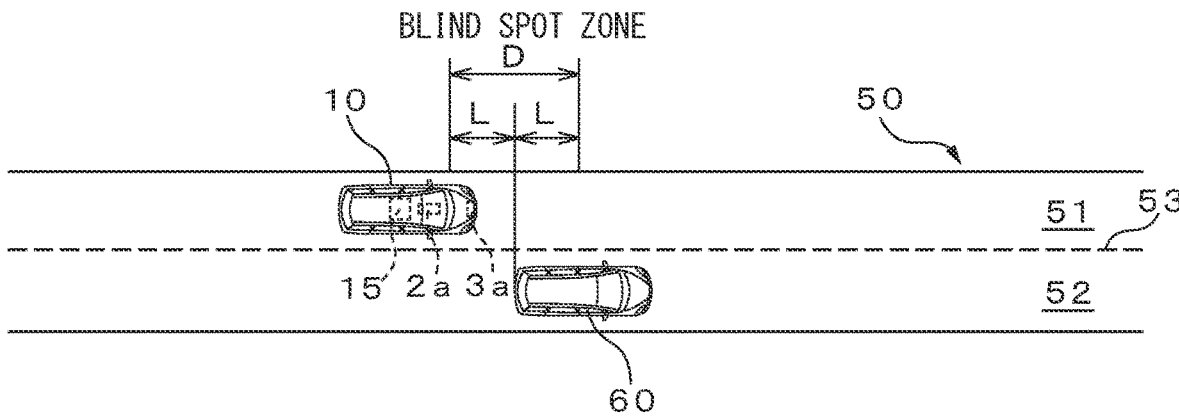
FIG. 1A is a diagram illustrating operation of the drive planning device of the embodiment in overview, showing a vehicle located in a blind spot zone.
Figure 1B:
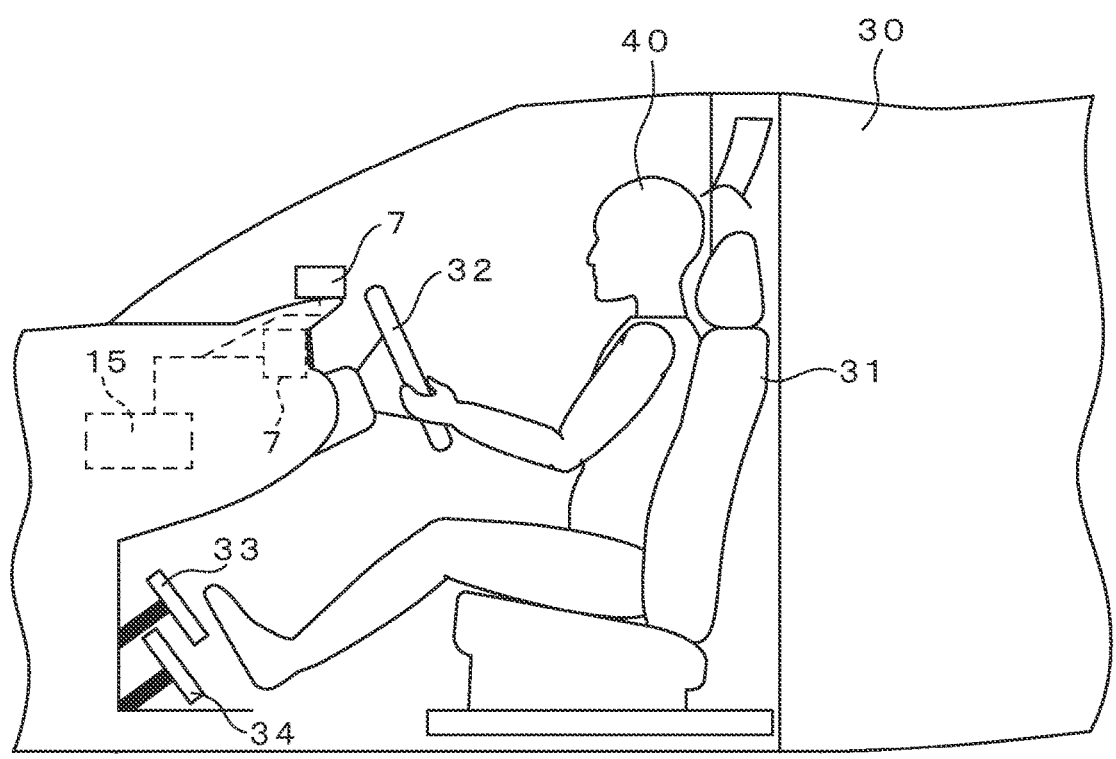
FIG. 1B is a diagram illustrating operation of the drive planning device of the embodiment in overview, and showing a driver inside a vehicle.

FIG. 1A and FIG. 1B are diagrams showing operation of a drive planning device 15 according to an embodiment in overview. FIG. 1A shows a vehicle 10 located in a blind spot zone, and FIG. 1B shows a driver 40 in the vehicle cabin 30.

As shown in FIG. 1A, the vehicle 10 is traveling on a road 50. The road 50 has two lanes 51, 52. The lane 51 and lane 52 are divided by a lane marking line (lane boundary line) 53. The vehicle 10 is traveling in the lane 51. Another vehicle 60 is also traveling in the adjacent lane 52 which is adjacent to the lane 51.

The vehicle 10 has a drive planning device 15. The vehicle 10 has a self-driving mode in which the vehicle 10 is driven primarily by automatic control, and a manual driving mode in which the vehicle 10 is driven primarily by the driver 40. The vehicle 10 is currently being controlled in self-driving mode. The vehicle 10 may also be a self-driving vehicle. The drive planning device 15 is an example of the vehicle control device.

In manual driving mode, the driver 40 sitting in the driving seat 31 in the vehicle cabin 30 operates the steering wheel 32, accelerator pedal 33 or brake pedal 34, so that the vehicle 10 is driven primarily by the driver 40.

The drive planning device 15 determines that the vehicle 10 is located in a blind spot zone D of the vehicle 60, based on information output from a camera 2a and a LiDAR sensor 3a. The vehicle 10 located in the blind spot zone D is difficult to recognize by the driver driving the vehicle 60 or the sensors (not shown) of the vehicle 60.

The drive planning device 15 decides to initiate movement control to cause the vehicle 10 to move from the blind spot zone D of the vehicle 60 to a location outside of the blind spot zone D, by changing the speed of the vehicle 10 in a predetermined direction.

For example, the drive planning device 15 decides to initiate movement control of the vehicle 10 so that the vehicle 10 is decelerated and moves behind the blind spot zone D of the vehicle 60.

Since the driver 40 desires to move out in front of the vehicle 60, they feel uncomfortable with speed control of the vehicle 10, and have performed an operation to accelerate the vehicle 10. For example, the driver 40 may have operated the accelerator pedal 33 to accelerate the vehicle 10.

Since an operation has been executed by the driver 40 to change the speed of the vehicle 10 in the opposite direction to the direction in which the speed of the vehicle 10 changes by the movement control, the drive planning device 15 decides to end the movement control.

The vehicle 10 accelerates the vehicle 10 in self-driving mode based on operation of the accelerator pedal 33 by the driver 40. The vehicle 10 moves forward in the traffic lane 51, passes the vehicle 60 in the traffic lane 52, and moves out of the blind spot zone D of the vehicle 60.

As explained above, the drive planning device 15 of the embodiment ends the movement control when an operation to change the speed of the vehicle 10 in the opposite manner has been executed by the driver 40, after the movement control has been initiated to move the vehicle 10 out of the blind spot zone D of the vehicle 60 by changing the speed of the vehicle 10. The drive planning device 15 of the embodiment can thus reduce discomfort experienced by the driver 40 with speed control of the vehicle 10.

Figure 2:
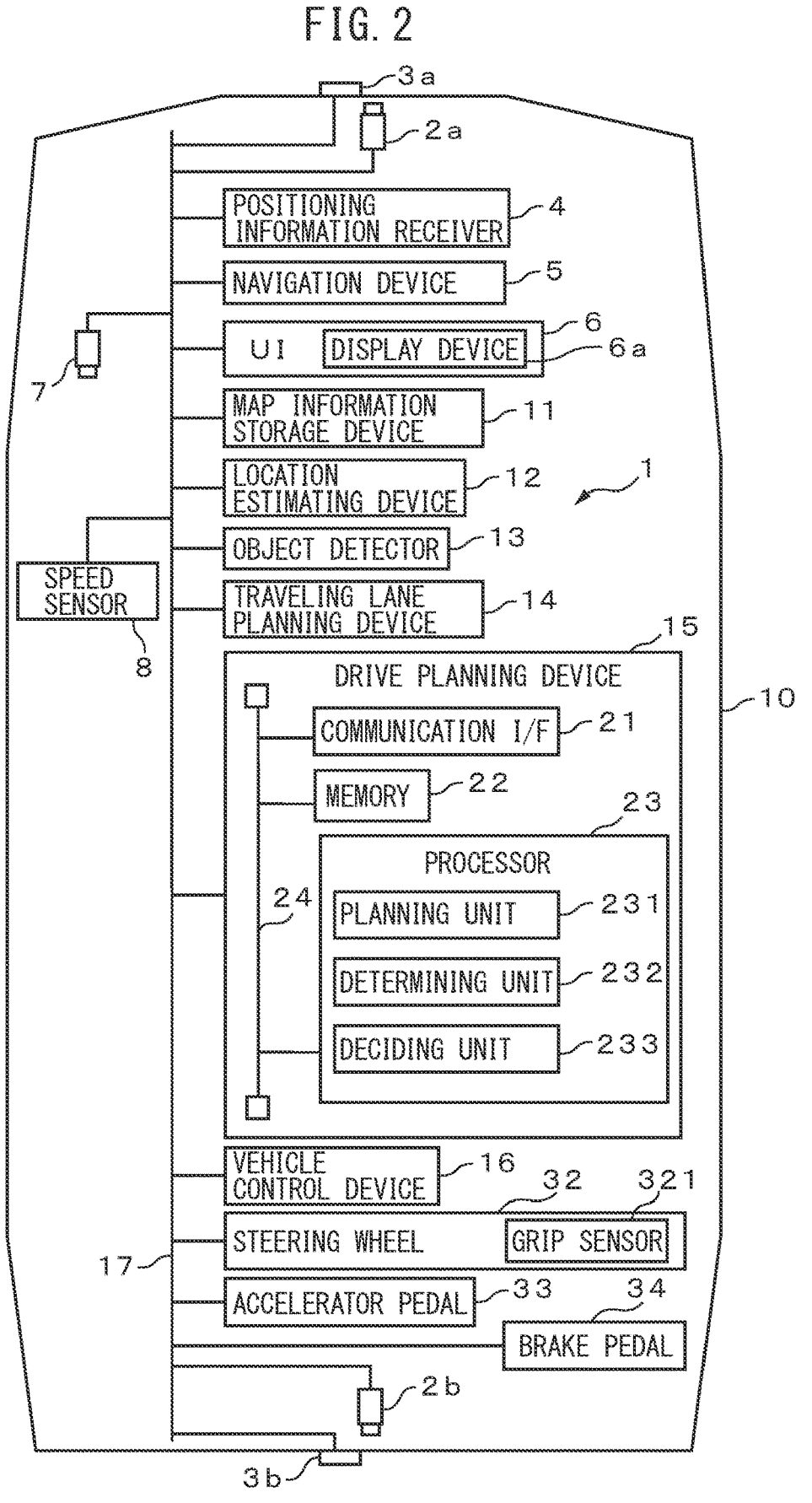
FIG. 2 is a hardware configuration diagram for a vehicle in which the drive planning device of the embodiment is mounted.

FIG. 2 is a hardware configuration diagram of a vehicle 10 in which a vehicle control system 1 is mounted that comprises a drive planning device 15. The vehicle 10 has cameras 2a, 2b, LiDAR sensors 3a, 3b, a positioning information receiver 4, a navigation device 5, a user interface (UI) 6, a monitoring camera 7, a speed sensor 8, a map information storage device 11, a location estimating device 12, an object detector 13, a traveling lane planning device 14, a drive planning device 15, a vehicle control device 16, a steering wheel 32, an accelerator pedal 33 and a brake pedal 34. The vehicle control system 1 may also have a radar sensor, as another distance sensor (not shown) for measurement of the distance of the vehicle 10 to surrounding objects.

The cameras 2a, 2b, LiDAR sensors 3a, 3b, positioning information receiver 4, navigation device 5, UI 6, monitoring camera 7, speed sensor 8, map information storage device 11, location estimating device 12, object detector 13, traveling lane planning device 14, drive planning device 15, vehicle control device 16, steering wheel 32, accelerator pedal 33 and brake pedal 34 are connected in a communicable manner via an in-vehicle network 17 conforming to the Controller Area Network standard.

The cameras 2a, 2b are examples of imaging units provided in the vehicle 10. The camera 2a is mounted inside the vehicle 10 and directed toward the front of the vehicle 10. The camera 2b is mounted inside the vehicle 10 and directed toward the rear of the vehicle 10. The cameras 2a, 2b each take a camera image in which the environment of a predetermined region ahead of and behind the vehicle 10 is shown, at a camera image photograph time set to a predetermined cycle, for example. The camera image can show the road in the predetermined region ahead of or behind the vehicle 10, and road features such as surface lane marking lines on the road. A camera image taken by the camera 2a may also have other vehicles located at the left front, front and right front of the vehicle 10. A camera image taken by the camera 2b may have other vehicles located at the left rear, rear and right rear of the vehicle 10. The cameras 2a, 2b each have a 2D detector composed of an array of photoelectric conversion elements with visible light sensitivity, such as a CCD or C-MOS, and an imaging optical system that forms an image of the photographed region on the 2D detector.

Each time a camera image is taken, the cameras 2a, 2b output camera images and camera image photograph times at which the camera images were taken, through the in-vehicle network 17 to the location estimating device 12 and object detector 13. The camera image is also used for processing at the location estimating device 12 to estimate the location of the vehicle 10. At the object detector 13, the camera image is used for processing to detect other objects surrounding the vehicle 10. The camera image is an example of information representing the environment surrounding the vehicle 10.

Each of the LiDAR sensors 3a, 3b is mounted on the outer side of the vehicle 10, for example, being directed toward the front or rear of the vehicle 10. The LiDAR sensors 3a and 3b respectively synchronize and emit a scanning pulsed laser ahead and to the rear of the vehicle 10, at a reflected wave information acquisition time set with a predetermined cycle, and receive a reflected wave that has been reflected from a reflector. The time required for the reflected wave to return contains information for the distance between the vehicle 10 and other objects located in the direction in which the laser has been emitted. Each of the LiDAR sensors 3a,

3b outputs the reflected wave information that includes the laser emission direction and the time required for the reflected wave to return, together with the reflected wave information acquisition time at which the laser was emitted, through the in-vehicle network 17 to the object detector 13. At the object detector 13, the reflected wave information is used for processing to detect objects surrounding the vehicle 10. The reflected wave information is an example of information representing the environment surrounding the vehicle 10.

The positioning information receiver 4 outputs positioning information that represents the current location of the vehicle 10. The positioning information receiver 4 may be a GNSS receiver, for example. The positioning information receiver 4 outputs positioning information and the positioning information acquisition time at which the positioning information has been acquired, to the navigation device 5 and map information storage device 11, each time positioning information is acquired at a predetermined receiving cycle.

Based on the navigation map information, the destination location of the vehicle 10 input through the UI 6, and positioning information representing the current location of the vehicle 10 input from the positioning information receiver 4, the navigation device 5 creates a navigation route from the current location to the destination location of the vehicle 10. When the destination location has been newly set or the current location of the vehicle 10 has exited the navigation route, the navigation device 5 creates a new navigation route for the vehicle 10. Every time a navigation route is created, the navigation device 5 outputs the navigation route to the location estimating device 12 and the traveling lane planning device 14, via the in-vehicle network 17.

The UI 6 is an example of the notification unit. The UI 6, controlled by the navigation device 5 and drive planning device 15, notifies the driver of the vehicle 10 traveling information. The traveling information of the vehicle 10 includes information relating to the current location of the vehicle 10 and the current and future route of the vehicle 10, such as the navigation route. The UI 6 has a display device 6a such as a liquid crystal display or touch panel, for display of the traveling information. The UI 6 may also have an acoustic output device (not shown) to notify the driver of traveling information. The UI 6 also generates an operation signal in response to operation of the vehicle 10 by the driver. The UI 6 also has a touch panel or operating button, for example, as an input device for inputting operation information from the driver to the vehicle 10. The operation information may be, for example, a destination location, transit points, vehicle speed, intervehicular distance or other control information of the vehicle 10. The UI 6 outputs the input operation information to the navigation device 5, the drive planning device 15 and the vehicle control device 16, via the in-vehicle network 17.

The monitoring camera 7 is disposed in the vehicle cabin 30 in a manner allowing it to photograph facial images including the face of the driver 40 driving the vehicle 10. The monitoring camera 7 is an example of an imaging unit. The monitoring camera 7 photographs a facial image representing the conditions including the driving seat 31 at a facial imaging time at a predetermined cycle. The monitoring camera 7 has a 2D detector composed of an array of photoelectric conversion elements with infrared sensitivity, such as a CCD or C-MOS, and an imaging optical system that forms an image of the photographed region on the 2D detector. The facial image is used for processing by the drive planning device 15 to estimate the direction of the line of sight of the driver 40.

The speed sensor 8 detects speed information representing the speed of the vehicle 10. The speed sensor 8 has a measuring device that measures the rotational speed of the tires of the vehicle 10. The speed sensor 8 outputs the speed information to the drive planning device 15 via the in-vehicle network 17. The speed information is used for processing by the drive planning device 15 to calculate the speed of the vehicle 10.

The steering wheel 32 generates a steering signal corresponding to the steering angle created by the driver 40, and outputs it to the drive planning device 15 and vehicle control device 16 via the in-vehicle network 17. The steering wheel 32 may also have a grip sensor 321 that detects gripping by the driver 40. When the grip sensor 321 detects gripping of the steering wheel 32 by the driver 40, it generates a grip signal and outputs it to the drive planning device 15 via the in-vehicle network 17.

The accelerator pedal 33 generates an accelerator operation signal corresponding to the accelerator level created by the driver 40, and outputs it to the drive planning device 15 and vehicle control device 16 via the in-vehicle network 17.

The brake pedal 34 generates a brake operation signal corresponding to the brake level created by the driver 40, and outputs it to the drive planning device 15 and vehicle control device 16 via the in-vehicle network 17.

The map information storage device 11 stores wide-area map information for a relatively wide area (an area of 10 to 30 km², for example) that includes the current location of the vehicle 10. The map information preferably has high-precision map information including three-dimensional information for the road surface, information for the types and locations of structures and road features such as road lane marking lines, and the legal speed limit for the road. The map information storage device 11 receives the wide-area map information from an external server via a base station, by wireless communication through a wireless communication device (not shown) mounted in the vehicle 10, in relation to the current location of the vehicle 10, and stores it in the storage device. Each time positioning information is input from the positioning information receiver 4, the map information storage device 11 refers to the stored wide-area map information and outputs map information for a relatively narrow area including the current location represented by the positioning information (for example, an area of 100 m to 10 km²), through the in-vehicle network 17 to the location estimating device 12, object detector 13, traveling lane planning device 14, drive planning device 15 and vehicle control device 16.

The location estimating device 12 estimates the location of the vehicle 10 at the camera image photograph time, based on the road features surrounding the vehicle 10 represented in the camera image taken by the camera 2a. For example, the location estimating device 12 compares lane marking lines identified in the camera image with lane marking lines represented in the map information input from the map information storage device 11, and determines the estimated location and estimated declination of the vehicle 10 at the camera image photograph time. The location estimating device 12 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 12 outputs this information to the object detector 13, traveling lane planning device 14, drive planning device 15 and vehicle control device 16. The location estimating device 12 may estimate the location of the vehicle 10 based on the two camera images taken by the camera 2b.

The object detector 13 detects objects at the left front, front and right front of the vehicle 10, and their type, based on the camera images taken by the camera 2a. The object detector 13 also detects objects at the left rear, rear and right rear of the vehicle 10, and their type, based on the camera images taken by the camera 2b. Objects also include other vehicles traveling around the vehicle 10. The object detector 13 has a classifier that detects objects represented in the camera image, by inputting the image, for example. The classifier may use a deep neural network (DNN) that has been trained to detect objects represented in input images, for example. The object detector 13 used may also be a classifier other than a DNN. For example, the classifier used by the object detector 13 may be a support vector machine (SVM) that has been trained to output a confidence factor for representation of objects to be detected in the window, with the input being a feature descriptor (such as Histogram of Oriented Gradients, HOG, for example) calculated from a window set in the camera image. Alternatively, the object detector 13 may detect an object region by template matching between the image and a template in which an object to be detected is represented.

The object detector 13 also detects objects at the left front, front and right front of the vehicle 10, based on reflected wave information output by the LiDAR sensor 3a, and detects objects at the left rear, rear and right rear of the vehicle 10, based on reflected wave information output by the LiDAR sensor 3b. The object detector 13 can also determine the orientation of an object with respect to the vehicle 10 based on the location of the object in the camera image, and may determine the distance between the object and the vehicle 10, based on the orientation and on the reflected wave information output by the LiDAR sensors 3a, 3b. The object detector 13 estimates the location of the object represented in a world coordinate system based on the current location of the vehicle 10, and the distance of the object from the vehicle 10 and its orientation, for example. The object detector 13 also tracks objects to be detected from an updated image, by matching objects detected in the updated camera image with objects detected in previous images, according to a tracking process based on optical flow. The object detector 13 also calculates the trajectory of an object being tracked, based on the location of the object in an image updated from a previous image, represented in the world coordinate system. The object detector 13 estimates the speed of an object with respect to the vehicle 10, based on changes in the location of the object over the course of time. The object detector 13 can also estimate the acceleration of an object based on changes in the speed of the object over the course of time. In addition, the object detector 13 identifies the traveling lanes in which the objects are traveling, based on the lane marking lines represented in the map information and the locations of the objects. The object detector 13 also determines, for example, whether an object is traveling in a traffic lane defined by two mutually adjacent lane marking lines situated on either side of the center location of the object in the lateral direction. The object detector 13 outputs object detection information which includes information representing the types of objects that were detected, information indicating their locations, and also information indicating their speeds, accelerations and traveling lanes, to the traveling lane planning device 14, drive planning device 15 and vehicle control device 16. When the object is another vehicle, the location of the object includes the location of the center of gravity of the vehicle and the location of the rear end of the vehicle. The object detection information is generated based on information representing the environment surrounding the vehicle 10. The object detection information is an example of information representing the environment surrounding the vehicle 10.

At a traveling lane-planning creation time set in a predetermined cycle, the traveling lane planning device 14 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. For example, the traveling lane planning device 14 creates a traveling lane plan for the vehicle 10 to travel on a traffic lane other than a passing lane. Each time a traveling lane plan is created, the traveling lane planning device 14 outputs the traveling lane plan to the drive planning device 15.

The traveling lane planning device 14 also determines whether or not a lane change is necessary within the nearest driving zone selected from the navigation route, based on the traveling lane plan, the map information, the navigation route and the current location of the vehicle 10, and generates a lane change plan in accordance with the assessment results. The lane change plan includes a lane change schedule zone in the lane in which the vehicle 10 is traveling, where it is scheduled to move to an adjacent lane. Specifically, the traveling lane planning device 14 determines whether or not a lane change is necessary for moving to a traffic lane toward the destination location of the vehicle 10, based on the navigation route and the current location of the vehicle 10. The traveling lane planning device 14 determines whether or not the vehicle 10 is approaching another road that merges ahead from the traveling road on which it is currently traveling (merge), or the vehicle 10 is exiting onto another road branching out ahead from the traveling road (branch). Since merging and branching involve movement of the vehicle from a lane of the traveling road to a lane in another road, a lane change is carried out. The traveling lane planning device 14 may further utilize surrounding environment information or vehicle status information to determine whether or not a lane change is necessary. The surrounding environment information includes the locations and speeds of other vehicles traveling around the vehicle 10. The vehicle status information includes the current location of the vehicle 10, and the vehicle speed, acceleration and traveling direction. The traveling lane planning device 14 also generates a lane change plan in response to a driver request. Information indicating the speed of the vehicle 10 and its acceleration is acquired using a sensor (not shown) mounted on the vehicle 10.

The drive planning device 15 carries out plan processing, determination processing and decision processing. The drive planning device 15 comprises a communication interface (IF) 21, a memory 22 and a processor 23 for this purpose. The communication interface 21, memory 22 and processor 23 are connected via signal wires 24. The communication interface 21 has an interface circuit to connect the drive planning device 15 with the in-vehicle network 17.

The memory 22 is an example of a memory unit, and it has a volatile semiconductor memory and a non-volatile semiconductor memory, for example. The memory 22 stores an application computer program and various data to be used for information processing carried out by the processor 23 of each device.

All or some of the functions of the drive planning device 15 are functional modules driven by a computer program operating on the processor 23, for example. The processor 23 has a planning unit 231, a determining unit 232 and a deciding unit 233. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit.

At a driving plan creation time set with a predetermined cycle, the planning unit 231 carries out driving plan processing in which it generates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. The planning unit 231 generates a driving plan to maintain a spacing of at least a predetermined distance between the vehicle 10 and other vehicles. The planning unit 231 creates the driving plan for travel based on the speed set by the driver 40 (hereunder also referred to as "set speed"). The planning unit 231 also creates the driving plan for travel based on the intervehicular distance set by the driver 40 (hereunder also referred to as "set intervehicular distance"). The planning unit 231 outputs the driving plan to the vehicle control device 16 for each driving plan generated. Other operation by the drive planning device 15 will be described in detail below.

The vehicle control device 16 has two control modes with different degrees of participation of the driver 40 in driving. The vehicle control device 16 controls the operation of the vehicle 10 according to the control mode.

For example, the vehicle control device 16 has a self-driving mode in which the degree to which the driver 40 participates in driving is low (for example, driving mode with levels 3 to 5) and a manual driving mode in which the degree to which the driver 40 participates in driving is high (for example, driving mode with levels 0 to 2). In self-driving mode, the vehicle 10 is driven primarily by the vehicle control device 16. In manual driving mode, the vehicle 10 is driven primarily by the driver 40.

In self-driving mode in which the degree to which the driver 40 participates in driving is low, all or some of the driving operations necessary for traveling of the vehicle 10 are executed automatically, while in manual driving mode in which the degree to which the driver 40 participates in driving is high, the types of driving operations executed automatically are fewer than in the driving mode in which the degree to which the driver 40 participates in driving is low, or are zero.

When the vehicle 10 is driven in self-driving mode, the vehicle control device 16 controls each unit of the vehicle 10 based on the current location of the vehicle 10 and the vehicle speed and yaw rate, as well as on the driving plan generated by the drive planning device 15. For example, the vehicle control device 16 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 16 also outputs a control signal corresponding to a set steering amount, to an actuator (not shown) that controls the steering wheel for the vehicle 10, via the in-vehicle network 17. The vehicle control device 16 also outputs a control signal corresponding to the set accelerator level, to a drive unit such as an engine or motor (not shown) of the vehicle 10, via the in-vehicle network 17. Alternatively, the vehicle control device 16 may output a control signal corresponding to a set brake level to the brake (not shown) of the vehicle 10, via the in-vehicle network 17.

In manual driving mode, on the other hand, the driver 40 can use the steering wheel 32, accelerator pedal 33 and brake pedal 34 for operation of the vehicle 10. When the vehicle 10 is operated manually, the vehicle control device 16 controls the steering wheel, drive unit or brake according to the steering signal, accelerator operation signal or brake operation signal according to operation by the driver 40. In the manual driving mode, at least one operation of the vehicle 10 from among driving, braking and steering is controlled manually. A change from automatic control to manual control is possible, depending on the request by the driver 40.

Even when the vehicle 10 is operated in self-driving mode, the vehicle control device 16 still controls the steering wheel, drive unit or brake based on the steering signal, accelerator operation signal or brake operation signal according to operation by the driver 40, when these signals have been output.

The drive planning device 15 is an electronic control unit (ECU), for example. For FIG. 2, the map information storage device 11, location estimating device 12, object detector 13, traveling lane planning device 14, drive planning device 15 and vehicle control device 16 were explained as separate devices, but all or some of them may be constructed in a single device.

Figure 3:
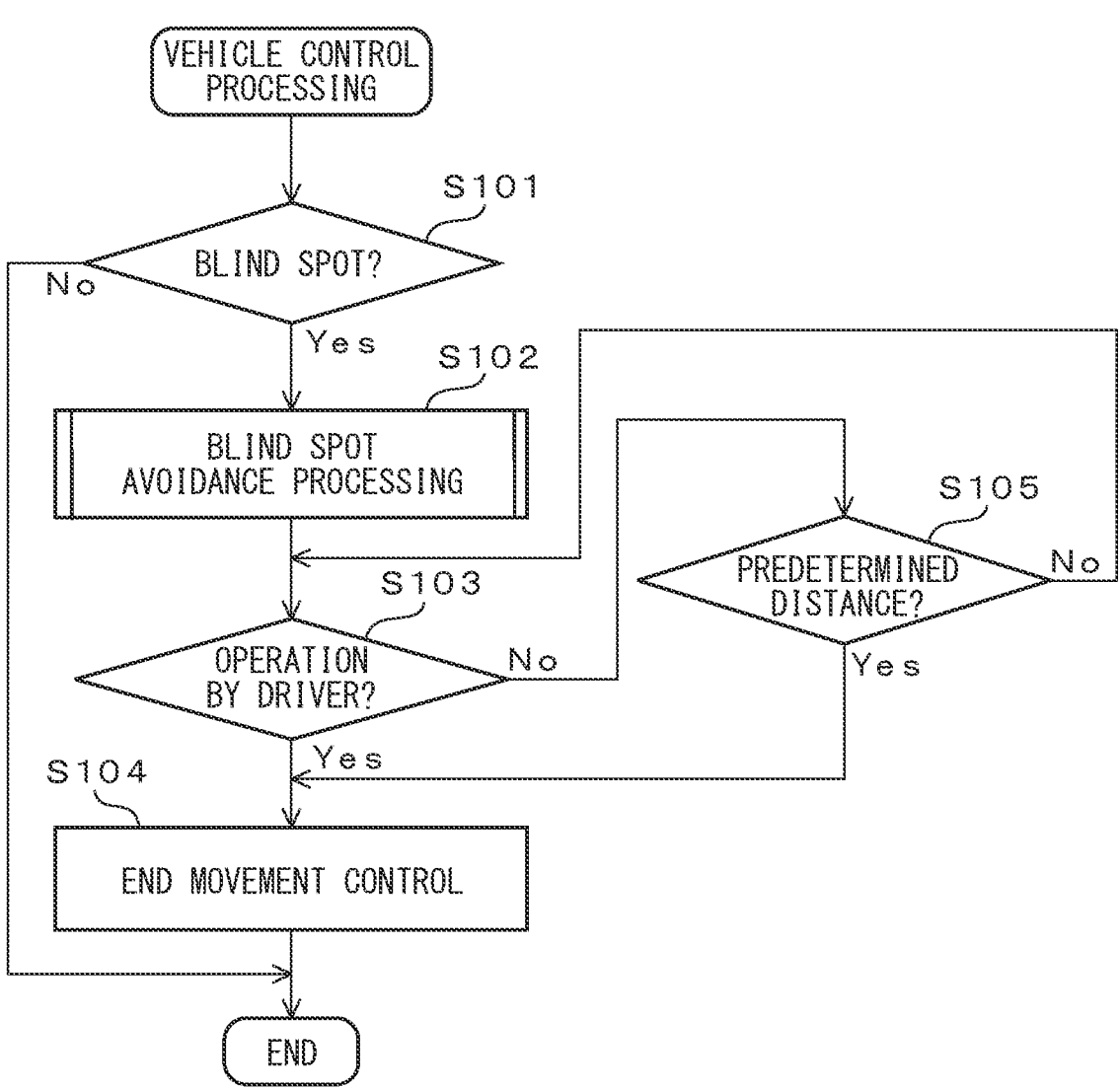
FIG. 3 is an example of an operation flow chart for vehicle control processing by the drive planning device of the embodiment.

FIG. 3 is an example of an operation flow chart for vehicle control processing by a drive planning device 15 of the embodiment. Vehicle control processing by the drive planning device 15 will be described with reference to FIG. 3. The drive planning device 15 carries out vehicle control processing according to the operation flow chart shown in FIG. 3, at a vehicle control time having a predetermined cycle.

First, the determining unit 232 determines whether or not the vehicle 10 is located in a blind spot zone of another vehicle based on information representing the environment surrounding the vehicle 10 (blind spot determination processing) (step S101). Blind spot determination processing is described below with reference to FIG. 4. The determining unit 232 is an example of a first determining unit.

When the vehicle 10 is located in a blind spot zone of another vehicle (step S101—Yes), the determining unit 232 and deciding unit 233 carry out blind spot avoidance processing in which they decide the direction in which to change the speed of the vehicle 10, in order to move the vehicle 10 out of the blind spot zone (step S102). Blind spot avoidance processing is described below with reference to FIG. 5. In blind spot avoidance processing, it is decided to change either the direction of acceleration or the direction of deceleration of the speed of the vehicle 10, and to initiate the movement control to cause the vehicle 10 to move from the blind spot zone of the other vehicle to a location outside of the blind spot zone. The deciding unit 233 is an example of a first deciding unit. The planning unit 231 creates a driving plan which includes the movement control based on the decision in blind spot avoidance processing. The vehicle control device 16 carries out the movement control based on the driving plan.

While carrying out the movement control, the determining unit 232 then determines whether or not an operation has been executed by the driver 40 to change the speed of the vehicle 10 in the opposite direction to the direction in which the speed of the vehicle 10 changes by the movement control, based on information representing operation of the vehicle 10 by the driver 40 (driver determination processing) (step S103). Driver determination processing is described below with reference to FIG. 6. The determining unit 232 is an example of a second determining unit.

When an operation has been executed by the driver 40 to change the speed of the vehicle 10 in the opposition direction (step S103—Yes), the deciding unit 233 decides to end the movement control (step S104), and the series of processing steps is complete. The deciding unit 233 is an example of a second deciding unit.

When an operation has not been executed by the driver 40 to change the speed of the vehicle 10 in the opposite direction (step S103—No), the determining unit 232 determines whether or not the location of the vehicle 10 is separated by a predetermined distance from the other vehicle (step S105). When the distance between the vehicle 10 and another vehicle traveling on the adjacent lane in the traveling direction of the vehicle 10 is at least a predetermined distance (such as 35 m), the determining unit 232 determines that they are separated by the predetermined distance. The vehicle 10 is not located in a blind spot zone of the other vehicle. Moreover since the vehicle 10 is separated from the other vehicle by an adequate distance it is unlikely that the vehicle 10 is located in a blind spot zone of the other vehicle, and therefore the movement control is ended.

When the distance between the vehicle 10 and another vehicle traveling on the adjacent lane in the traveling direction of the vehicle 10 is less than the predetermined distance, on the other hand, the determining unit 232 determines that they are not separated by the predetermined distance. The movement control is continued in this case.

When there is separation by the predetermined distance (step S105—Yes), processing proceeds to step S104. When there is not separation by the predetermined distance (step S105—No), processing returns to step S103.

When the vehicle 10 is not located in a blind spot zone of another vehicle (step S101—No), the series of processing steps is complete.

Figure 4:
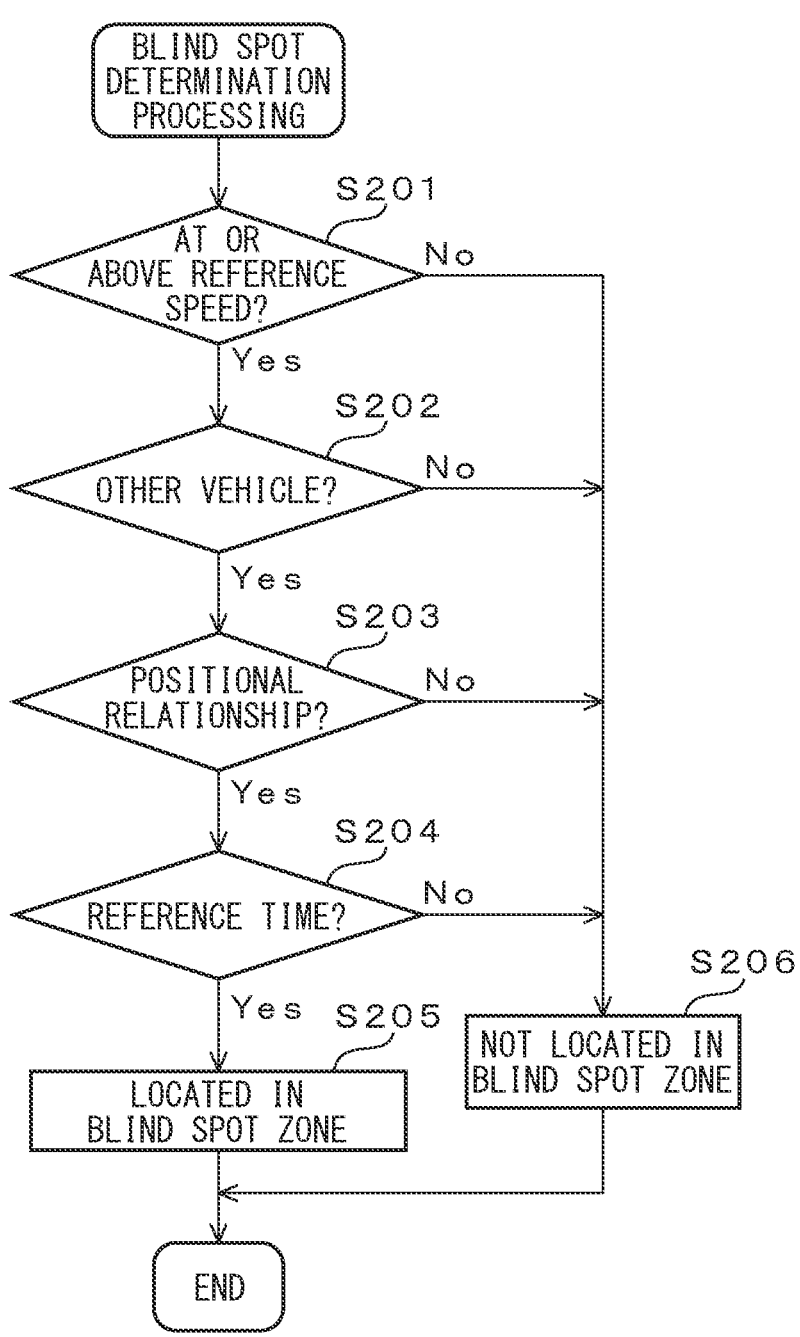
FIG. 4 is an example of an operation flow chart for blind spot determination processing by the drive planning device of the embodiment.

FIG. 4 is an example of an operation flow chart for blind spot determination processing by the drive planning device of the embodiment. The drive planning device 15 carries out blind spot determination processing according to the operation flow chart shown in FIG. 4, at a blind spot determination time having a predetermined cycle. The determination by the determining unit 232 in step S101 is based on the determination results of blind spot determination processing executed according to the operation flow chart shown in FIG. 4.

First, the determining unit 232 determines whether or not the speed of the vehicle 10 is at or above a reference speed (step S201). The determining unit 232 calculates the speed of the vehicle 10 based on speed information. For example, the determining unit 232 calculates the speed of the vehicle 10 to be the nearest average speed (for example, the average speed during 5 seconds), based on vehicle speed information. The reference speed may be between 50 km/hr and 60 km/hr. The determining unit 232 may also determine whether or not the speed of the vehicle 10 is within a reference speed range.

When the speed of the vehicle 10 is at or above the reference speed (step S201—Yes), the determining unit 232 determines whether or not another vehicle is located on an adjacent lane which is adjacent to the traffic lane in which the vehicle 10 is traveling, within a predetermined range from the current location of the vehicle 10 (step S202). The predetermined range may be 10 m, for example. The determining unit 232 acquires the current location of the vehicle 10 from the location estimating device 12. The determining unit 232 ascertains the locations of other vehicles in adjacent lanes based on object detection information.

When another vehicle is located in an adjacent lane (step S202—Yes), the determining unit 232 determines whether or not the positional relationship between the vehicle 10 and the other vehicle in the adjacent lane satisfies a predetermined relationship (step S203). The determining unit 232 determines that the predetermined relationship is satisfied when the location of the front end of the vehicle 10 is within a predetermined range with respect to the location of the back end of the other vehicle, in the traveling direction of the vehicle 10. The determining unit 232 calculates the location of the front end of the vehicle 10 based on the current location of the vehicle 10 (for example, the location of the center of gravity of the vehicle 10), and the distance between the center of gravity and front end of the vehicle 10. The distance between the center of gravity and the front end of the vehicle 10 is stored in the memory 22. The determining unit 232 also ascertains the locations of the back ends of other vehicles based on object detection information.

In the example shown in FIG. 1A, the range of the distance L ahead and behind the location of the back end of the vehicle 60 along the traveling direction of the vehicle 10 is the blind spot zone D of the vehicle 60. Since the location of the front end of the vehicle 10 is within the range of the distance L with respect to the location of the back end of the vehicle 60 in the adjacent traffic lane 52 in the traveling direction of the vehicle 10, the determining unit 232 determines that the predetermined relationship is satisfied.

When the positional relationship satisfies the predetermined relationship (step S203—Yes), the determining unit 232 determines whether or not a predetermined reference time has elapsed with the positional relationship satisfying the predetermined relationship (step S204). The reference time may be 7 seconds, for example. The cycle for the blind spot determination time is preferably shorter than the reference time. In this case, after it has been most recently determined that the vehicle 10 is not located in a blind spot zone, the determining unit 232 determines whether or not the time elapsed from the time point at which it was first determined that the positional relationship satisfies the predetermined relationship, is longer than the reference time.

When the reference time has elapsed (step S204—Yes), the determining unit 232 determines that the vehicle 10 is located in the blind spot zone of another vehicle (step S205), and the series of processing steps is complete.

Conversely, when the speed of the vehicle 10 is below the reference speed (step S201—No), when no other vehicle is located in an adjacent lane (step S202—No), when the positional relationship does not satisfy the predetermined relationship (step S203—No) or when the reference time has not elapsed (step S204—No), the determining unit 232 determines that the vehicle 10 is not located in a blind spot zone of another vehicle (step S206), and the series of processing steps is complete. This completes explanation of blind spot determination processing.

Figure 5:
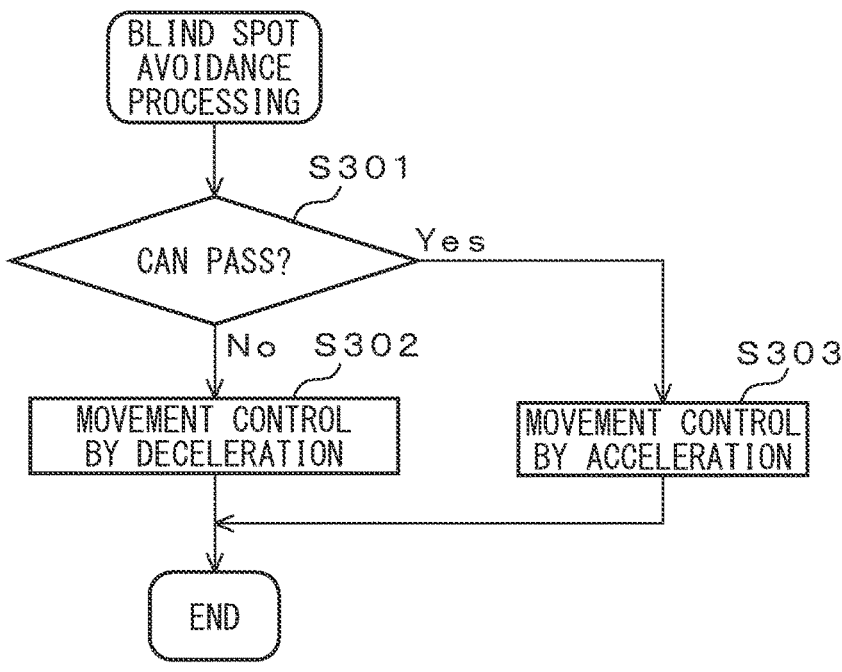
FIG. 5 is an example of an operation flow chart for blind spot avoidance processing by the drive planning device of the embodiment.

FIG. 5 is an example of an operation flow chart for blind spot avoidance processing by the drive planning device 15 of the embodiment. In step S102 described above, the drive planning device 15 carries out blind spot avoidance processing according to the operation flow chart shown in FIG. 5.

First, the determining unit 232 determines whether or not the vehicle 10 can pass another vehicle traveling in an adjacent lane (step S301). For example, the determining unit 232 determines whether or not the set speed of the vehicle 10 is faster than the speed of the other vehicle traveling in the adjacent lane. Based on object detection information, the determining unit 232 ascertains the speed of other vehicles traveling in adjacent lanes. The most recent average speed of the vehicle 10 (such as the average speed during 5 seconds) may also be used, instead of a set speed.

When the set speed of the vehicle 10 is faster than the speed of the other vehicle, the determining unit 232 determines whether or not a predetermined reference distance can be ensured between the vehicle 10 and another vehicle in a traveling lane in which the vehicle 10 is traveling, while the vehicle 10 passes the other vehicle traveling in the adjacent lane.

The determining unit 232 estimates the location of the other vehicle at the point at which the vehicle 10 has passed the other vehicle traveling in the adjacent lane. The determining unit 232 estimates the time required for the vehicle 10 to pass the other vehicle traveling in the adjacent lane, and estimates the location of the other vehicle at the point where the estimated time has elapsed.

The determining unit 232 estimates the clearance between the location of the vehicle 10 at the point at which the vehicle 10 has passed the other vehicle traveling in the adjacent lane, and the location of the other vehicle. When the distance between the vehicle 10 and another vehicle traveling on the adjacent lane in the traveling direction of the vehicle 10 is at least a predetermined distance (such as 35 m), the determining unit 232 determines that the vehicle 10 is able to pass the other vehicle traveling in the adjacent lane. When the distance between the vehicle 10 and the other vehicle traveling on the adjacent lane in the traveling direction of the vehicle 10 is less than the predetermined distance, on the other hand, the determining unit 232 determines that the vehicle 10 is not able to pass the other vehicle traveling in the adjacent lane. When the set speed of the vehicle 10 is not faster than the speed of the other vehicle, the determining unit 232 likewise determines that the vehicle 10 is not able to pass the other vehicle traveling in the adjacent lane.

When it is not able to pass (step S301—No), the deciding unit 233 decides to initiate the movement control by decelerating the vehicle 10 (step S302), and the series of processing steps is complete. The deciding unit 233 notifies the planning unit 231 that the movement control is to be initiated. The planning unit 231 creates a driving plan so as to execute the movement control. With the movement control, the planning unit 231 creates a driving plan so as to decelerate the vehicle 10 to move the vehicle 10 from the blind spot zone of the other vehicle in the adjacent lane to a location outside of the blind spot zone, and to cause the vehicle 10 to follow while opening a space of a predetermined distance (such as 7 m) behind the other vehicle, along the traveling direction of the vehicle 10. The planning unit 231 thus allows the vehicle 10 to withdraw from the blind spot zone of the other vehicle, thereby preventing the vehicle 10 from being located in the blind spot zone again.

When it is able to pass (step S301—Yes), on the other hand, the deciding unit 233 decides to initiate the movement control by accelerating the vehicle 10 (step S303), and the series of processing steps is complete. The deciding unit 233 notifies the planning unit 231 that the movement control is to be initiated. The planning unit 231 creates a driving plan so as to execute the movement control. With the movement control, the planning unit 231 creates a driving plan to move the vehicle 10 from the blind spot zone of the other vehicle in the adjacent lane to a location outside of the blind spot zone at the set speed. The planning unit 231 withdraws the vehicle 10 from the blind spot zone of the other vehicle. This completes explanation of blind spot avoidance processing.

Figure 6:
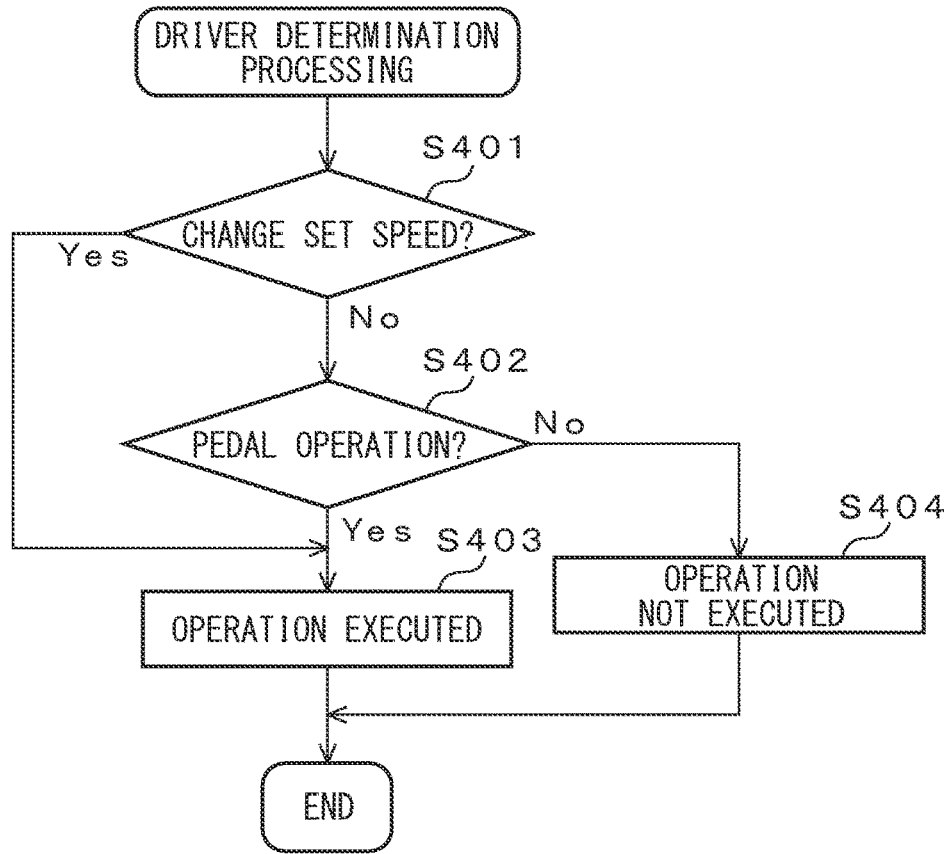
FIG. 6 is an example of an operation flow chart for driver determination processing by the drive planning device of the embodiment.

FIG. 6 is an example of an operation flow chart for driver determination processing by the drive planning device 15 of the embodiment. In step S103 described above, the drive planning device 15 carries out driver determination processing according to the operation flow chart shown in FIG. 6.

First, the determining unit 232 determines whether or not an operation has been executed by the driver 40 to set the speed of the vehicle 10 in the opposite direction to the direction in which the speed of the vehicle 10 changes by the movement control, based on information representing operation of the vehicle 10 by the driver 40 (step S401). The direction in which the speed of the vehicle 10 changed by the movement control includes the direction of speed acceleration and the direction of speed deceleration. When an operation signal has been input by operation of the UI 6 by the driver 40 during operation to change the set speed, the determining unit 232 determines that an operation has been carried out by the driver 40 for change of the set speed, whereby the speed of the vehicle 10 is set. The operation signal received during operation to change the set speed is an example of information representing operation of the vehicle 10 by the driver.

When the UI 6 has been operated by the driver 40 so as to increase the set speed, after the movement control has been initiated by the vehicle control device 16 to decelerate the vehicle 10, the determining unit 232 determines that an operation has been executed by the driver 40 to set the speed of the vehicle 10. When the UI 6 has not been operated by the driver 40 so as to increase the set speed after the movement control has been initiated by the vehicle control device 16 to decelerate the vehicle 10, on the other hand, the determining unit 232 determines that an operation has not been executed by the driver 40 to set the speed of the vehicle 10.

When the UI 6 has been operated by the driver 40 so as to decrease the set speed after the movement control has been initiated by the vehicle control device 16 to accelerate the vehicle 10, the determining unit 232 determines that an operation has been executed by the driver 40 to set the speed of the vehicle 10. When the UI 6 has not been operated by the driver 40 so as to decrease the set speed after the movement control has been initiated by the vehicle control device 16 to accelerate the vehicle 10, on the other hand, the determining unit 232 determines that an operation has not been executed by the driver 40 to set the speed of the vehicle 10.

When an operation to change the set speed has not been performed by the driver 40 (step S401—No), the determining unit 232 determines whether or not the accelerator pedal 33 or brake pedal 34 has been operated by the driver 40 in the opposite direction to the direction in which the speed of the vehicle 10 changes by the movement control (step S402).

When an accelerator operation signal has been input, the determining unit 232 determines that the accelerator pedal 33 has been operated by the driver 40. When a brake operation signal has been input, the determining unit 232 determines that the brake pedal 34 has been operated by the driver 40. The accelerator operation signal and brake operation signal are examples of information representing driver operation of the vehicle 10.

When the accelerator pedal 33 has been operated by the driver 40 after the movement control has been initiated by the vehicle control device 16 to decelerate the vehicle 10, the determining unit 232 determines that the accelerator pedal 33 has been operated by the driver 40. When the accelerator pedal 33 has not been operated by the driver 40 after the movement control has been initiated by the vehicle control device 16 to decelerate the vehicle 10, on the other hand, the determining unit 232 determines that the accelerator pedal 33 has not been operated by the driver 40.

When the brake pedal 34 has been operated by the driver 40 after the movement control has been initiated by the vehicle control device 16 to accelerate the vehicle 10, the determining unit 232 determines that the brake pedal 34 has been operated by the driver 40. When the brake pedal 34 has not been operated by the driver 40 after the movement control has been initiated by the vehicle control device 16 to accelerate the vehicle 10, on the other hand, the determining unit 232 determines that the brake pedal 34 has not been operated by the driver 40.

Operation of the brake pedal 34 by the driver 40 may sometimes be interpreted by the vehicle control device 16 as the end of self-driving mode. Since it is unclear in such cases whether operation of the brake pedal 34 by the driver 40 is for the purpose of decelerating the vehicle 10 or as a request to end self-driving mode, driver determination processing is preferably not carried out based on operation of the brake pedal 34.

When the accelerator pedal 33 or brake pedal 34 has been operated by the driver 40 (step S402—Yes), or when operation has been carried out by the driver 40 to change the set speed (step S401—Yes), the determining unit 232 determines that operation to change the speed of the vehicle 10 has been executed by the driver 40 (step S403), and the series of processing steps is complete.

When the accelerator pedal 33 or brake pedal 34 has not been operated by the driver 40 (step S402—No), it is determined that an operation to change the speed of the vehicle 10 has not been executed by the driver 40 (step S404), and the series of processing steps is complete.

In step S401 described above, the determining unit 232 may determine that operation to change the speed of the vehicle 10 has been executed by the driver 40 when the driver 40 is gripping the steering wheel 32 or looking at the speed display unit (not shown), and an operation has been carried out by the driver 40 to change the set speed by which the speed of the vehicle 10 is set, in the direction opposite to the direction in which the speed of the vehicle 10 changes by the movement control. This will allow more precise determination that the driver 40 is attempting to change the speed of the vehicle 10 in the direction opposite to the direction in which the speed of the vehicle 10 changes by the movement control. The UI 6 may also be a speed display unit.

For example, the determining unit 232 may determine that the driver 40 is gripping the steering wheel 32 when a grip signal indicating that the driver 40 is gripping the steering wheel 32 has been input into the drive planning device 15.

The determining unit 232 estimates the direction of the line of sight of the driver 40 based on a facial image taken by the monitoring camera 7. The gaze position of the driver 40 is estimated based on the direction of the line of sight. When a condition in which the gaze position of the driver 40 aligns with the speed display unit continues for a predetermined period of time (such as 5 seconds), the determining unit 232 determines that the driver 40 is looking at the speed display unit. The method of estimating the gaze position based on the facial image may be any publicly known method. This completes explanation of driver determination processing.

As explained above, the drive planning device of the embodiment ends the movement control when an operation to change the speed of the vehicle in the opposite manner has been executed by the driver, after the movement control has been initiated to move the vehicle out of a blind spot zone of another vehicle by changing the speed of the vehicle. The drive planning device of the embodiment can thus reduce discomfort experienced by the driver with speed control of the vehicle.

Figure 7:
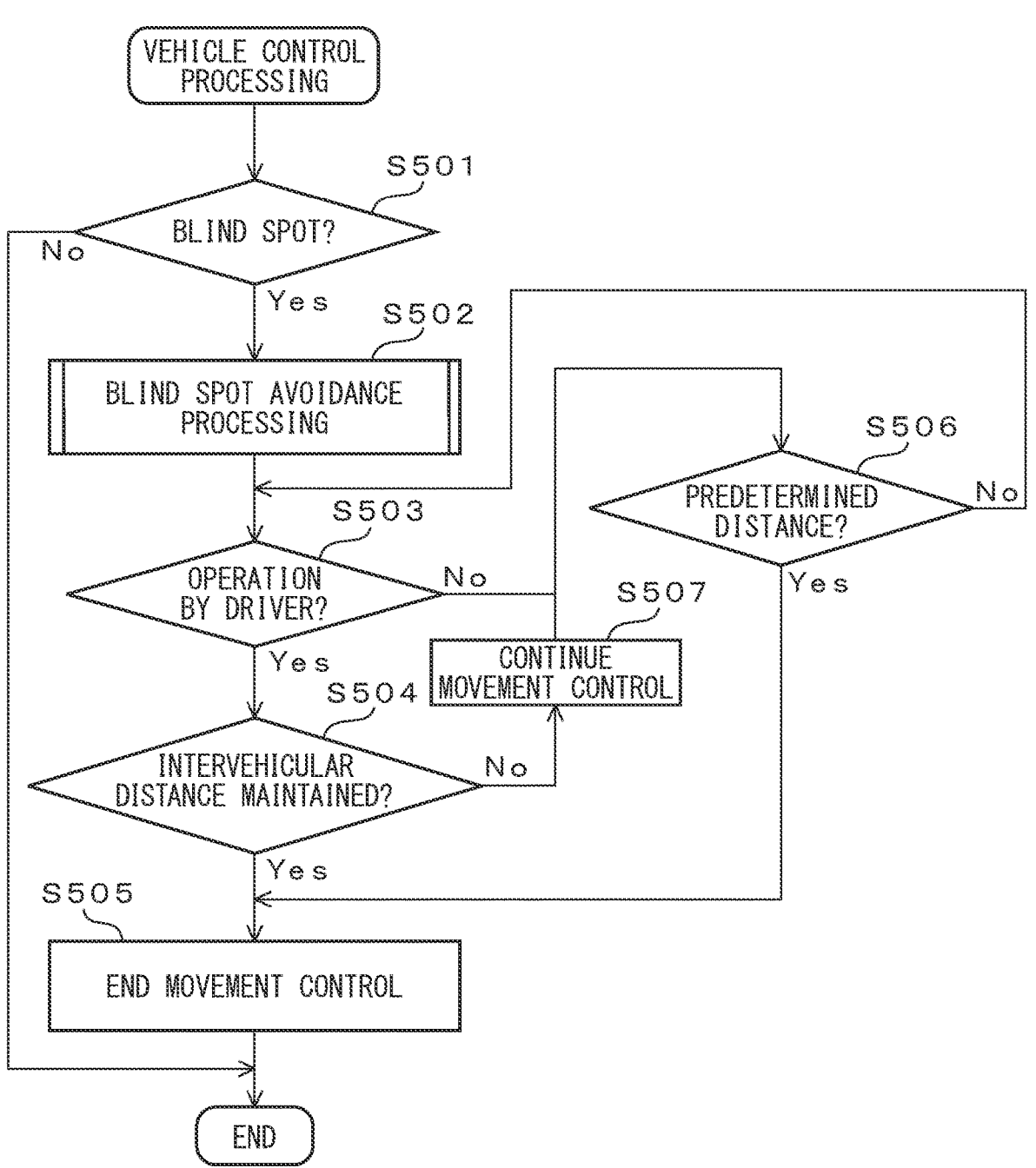
FIG. 7 is an example of an operation flow chart for a modified example of vehicle control processing by the drive planning device of the embodiment.

A modified example of the drive planning device of the aforementioned embodiment will now be described with reference to FIG. 7 and FIG. 8. FIG. 7 is an example of an operation flow chart for a modified example of vehicle control processing by a drive planning device of the embodiment.

Processing in steps S504 and S507 are added for this modified example, and they differ from the vehicle control processing shown in FIG. 3. The processing in steps S501 to S503, S505 and S506 are the same as in steps S101 to 106 described above.

When an operation to change the speed of the vehicle 10 has been executed by the driver 40 in the opposite direction (step S503—Yes), the determining unit 232 determines whether or not a predetermined reference intervehicular distance can be maintained between the vehicle 10 and another vehicle traveling in the traveling lane in which the vehicle 10 is traveling, while the speed of the vehicle 10 is changed by driver 40 operation to move the vehicle 10 from the blind spot zone of another vehicle in an adjacent lane to a location outside of the blind spot zone (step S504). The determining unit 232 is an example of a third determining unit. The reference intervehicular distance may be a set intervehicular distance, for example.

First, based on object detection information, the determining unit 232 determines whether or not another vehicle is located in the traveling lane in which the vehicle 10 is traveling, within a predetermined range from the current location of the vehicle 10. When another vehicle is located in the traveling lane, the determining unit 232 estimates the location of the vehicle 10 (first location) when the vehicle 10 will have moved from the blind spot zone of the other vehicle in the adjacent lane to a location outside of the blind spot zone, when the speed of the vehicle 10 has been changed by driver 40 operation. The determining unit 232 also estimates the location of the vehicle 10 (first location) when the vehicle 10 will have moved from the blind spot zone of the other vehicle in the adjacent lane to a location outside of the blind spot zone, when the vehicle 10 has traveled at a set speed set by the driver 40. Alternatively, the determining unit 232 estimates the speed of the vehicle 10 after change based on the degree of operation of the accelerator pedal 33 or brake pedal 34 by the driver 40, and estimates the location of the vehicle 10 (first location) when the vehicle 10 will have moved from the blind spot zone of the other vehicle in the adjacent lane to a location outside of the blind spot zone, when the vehicle 10 has traveled at this speed.

The determining unit 232 also estimates the time required for movement of the vehicle 10 from the blind spot zone of the other vehicle in the adjacent lane to a location outside of the blind spot zone, after the speed of the vehicle 10 has been changed by driver 40 operation. The determining unit 232 further estimates the location of the other vehicle in the traveling lane (second location) at the point at which the vehicle 10 will have moved from the blind spot zone of the other vehicle in the adjacent lane to a location outside of the blind spot zone. The determining unit 232 also calculates the clearance between the first location and the second location. The determining unit 232 determines whether or not the clearance is at least the reference intervehicular distance.

When the clearance is at least the predetermined intervehicular distance, or no other vehicle is located in the traveling lane, the determining unit 232 determines that the predetermined intervehicular distance can be maintained between the other vehicle and the vehicle 10. When the clearance is less than the reference intervehicular distance, on the other hand, the determining unit 232 determines that the predetermined intervehicular distance cannot be maintained between the other vehicle and the vehicle 10. When the reference intervehicular distance cannot be maintained between the vehicle 10 and the other vehicle in the traveling lane, it may not be possible to ensure safety of the vehicle 10.

When the predetermined intervehicular distance between the other vehicle and the vehicle 10 can be maintained (step S504—Yes), processing proceeds to step S505.

When the predetermined intervehicular distance between the other vehicle and the vehicle 10 cannot be maintained (step S504—No), the deciding unit 233 decides to continue without ending the movement control (step S507). Processing then proceeds to step S506.

Figure 8A:
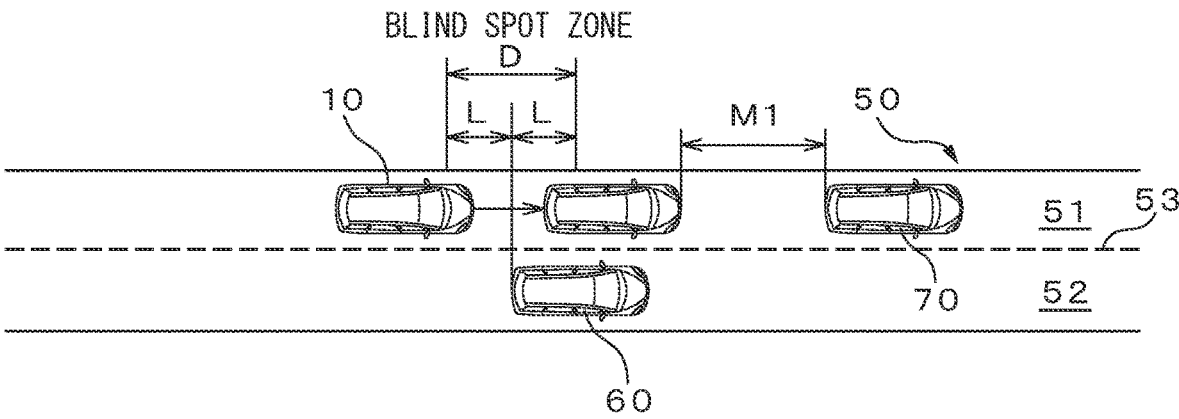
FIG. 8A is a diagram illustrating a modified example of vehicle control processing by the drive planning device of the embodiment, as an example in which movement control is continued.
Figure 8B:
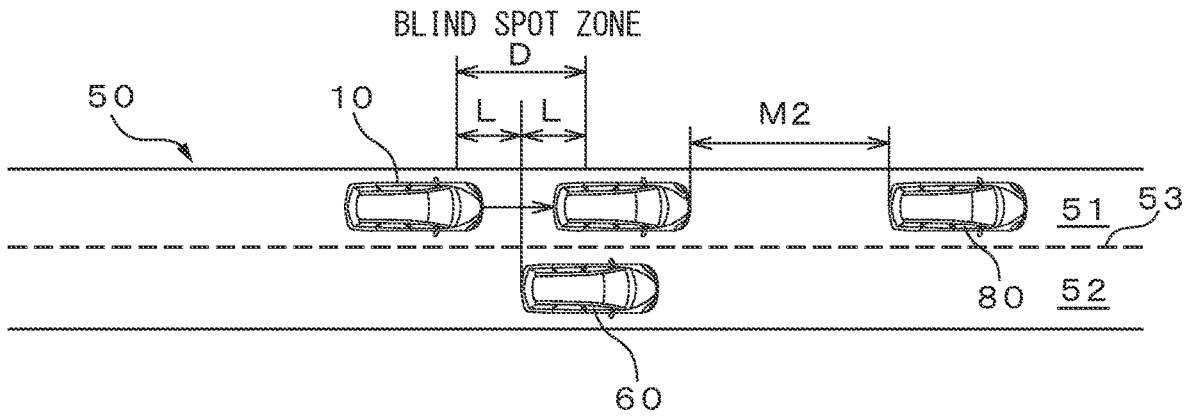
FIG. 8B is a diagram illustrating a modified example of vehicle control processing by the drive planning device of the embodiment, as an example in which movement control is ended.

FIG. 8A and FIG. 8B are diagrams showing vehicle control processing according to a modified example of the drive planning device 15 of the embodiment. FIG. 8A shows an example in which the movement control is continued, and FIG. 8B shows an example in which the movement control is ended.

In the example of FIG. 8A, the determining unit 232 determines that the vehicle 10 is located in a blind spot zone D of the vehicle 60. The deciding unit 233 decides to initiate the movement control to cause the vehicle 10 to move from the blind spot zone D of the vehicle 60 to a location outside of the blind spot zone D, by decelerating the vehicle 10.

Since the driver 40 desires to move out in front of the vehicle 60, they feel uncomfortable with speed control of the vehicle 10, and have performed an operation to accelerate the vehicle 10.

The determining unit 232 estimates M1 as the clearance between the vehicle 70 and the vehicle 10 traveling in the traffic lane 51, when the vehicle 10 is accelerated by driver 40 operation to move the vehicle 10 from the blind spot zone D of the vehicle 60 to a location outside of the blind spot zone D.

Since the clearance M1 is less than the reference intervehicular distance, the deciding unit 233 decides to continue without ending the movement control.

In the example of FIG. 8B as well, the determining unit 232 determines that the vehicle 10 is located in the blind spot zone D of the vehicle 60.

The deciding unit 233 decides to initiate the movement control to cause the vehicle 10 to move from the blind spot zone D of the vehicle 60 to a location outside of the blind spot zone D, by decelerating the vehicle 10.

Since the driver 40 desires to move out in front of the vehicle 60, they feel uncomfortable with speed control of the vehicle 10, and have performed an operation for acceleration.

The determining unit 232 estimates M2 as the clearance between the vehicle 70 and the vehicle 10, when the speed of the vehicle 10 has been changed by driver 40 operation to move the vehicle 10 from the blind spot zone D of the vehicle 60 to a location outside of the blind spot zone D.

Since the clearance M2 is at least the reference intervehicular distance, the deciding unit 233 decides to end the movement control.

In the drive planning device of the modified example described above, the movement control is ended when the predetermined intervehicular distance between the vehicle and the other vehicle can be maintained in the traveling lane even if operation to change the speed of the vehicle in the opposite manner has been executed by the driver after the movement control has been initiated. The drive planning device of the embodiment can thus reduce discomfort experienced by the driver with speed control of the vehicle.

The movement control is continued when the predetermined intervehicular distance between the vehicle and the other vehicle cannot be maintained in the traveling lane. The drive planning device of the embodiment can thus help ensure safety for the vehicle.

The vehicle control device, the computer program for vehicle control and the method for controlling a vehicle according to the embodiment described above may incorporate appropriate modifications that are still within the gist of the disclosure. Moreover, the technical scope of the disclosure is not limited to these embodiments, and includes the invention and its equivalents as laid out in the Claims.

For example, in driver determination processing for the embodiment described above, it was determined both whether or not there was a set speed change and whether or not there was a pedal operation, but the driver determination processing may instead determine only either whether or not there was a set speed change or whether or not there was a pedal operation. In this case, only step S401 or step S402 is carried out. When only step S401 is carried out, and no operation has been executed by the driver 40 for setting the speed of the vehicle 10 (step S401—No), the processing proceeds to step S404. When only step S402 is carried out, step S401 is omitted.

The invention claimed is:

1. A vehicle control device comprising:
a processor configured to
  determine whether or not a host vehicle is located in a blind spot zone of another vehicle based on information representing environment surrounding the host vehicle,
  decide to change speed of the host vehicle in a predetermined direction to initiate movement control to cause movement of the host vehicle from the blind spot zone of another vehicle to a location outside of the blind spot zone when it has been determined that the host vehicle is located in the blind spot zone of another vehicle,
  determine whether or not an operation has been executed by a driver of the host vehicle to change the speed of the host vehicle in the opposite direction to the predetermined direction based on information representing operation by the driver, while the movement control is being executed after its initiation has been decided, and
  end the movement control when it has been determined that the operation has been executed by the driver to change the speed of the host vehicle, wherein
the processor is further configured to:
  determine whether or not a predetermined intervehicular distance can be maintained between the host vehicle and a second other vehicle traveling in a traffic lane in which the host vehicle is traveling after the speed of the host vehicle has been changed by driver operation to move the host vehicle from the blind spot zone of the other vehicle to a location outside of the blind spot zone when it has been determined that the operation has been executed by the driver to change the speed of the host vehicle, and
  decide to continue without ending the movement control when it has been determined that the predetermined intervehicular distance between the host vehicle and the second other vehicle cannot be maintained.

2. The vehicle control device according to claim 1, wherein the processor is further configured to determine that the operation to change the speed of the host vehicle has been executed by the driver when an operation to set the speed of the host vehicle has been executed by the driver in the opposite direction to the predetermined direction.

3. The vehicle control device according to claim 2, wherein the processor is further configured to determine that the operation to change the speed of the host vehicle has been executed by the driver when the driver grips a steering wheel or looks at a speed display unit, and an operation to set the speed of the host vehicle has been executed by the driver in the opposite direction to the predetermined direction.

4. A computer-readable, non-transitory storage medium storing a computer program for vehicle control, which causes a processor to execute a process, the process comprising:
  determining whether or not a host vehicle is located in a blind spot zone of another vehicle based on information representing environment surrounding the host vehicle;
  deciding to change speed of the host vehicle in a predetermined direction to initiate movement control to cause movement of the host vehicle from the blind spot zone of another vehicle to a location outside of the blind spot zone when it has been determined that the host vehicle is located in the blind spot zone of another vehicle;
  determining whether or not an operation has been executed by a driver of the host vehicle to change the speed of the host vehicle in the opposite direction to the predetermined direction based on information representing operation by the driver, while the movement control is being executed; and
  ending the movement control when it has been determined that the operation has been executed by the driver to change the speed of the host vehicle, wherein
the process further includes:
  determining whether or not a predetermined intervehicular distance can be maintained between the host vehicle and a second other vehicle traveling in a traffic lane in which the host vehicle is traveling after the speed of the host vehicle has been changed by driver operation to move the host vehicle from the blind spot zone of the other vehicle to a location outside of the blind spot zone when it has been determined that the operation has been executed by the driver to change the speed of the host vehicle, and deciding to continue without ending the movement control when it has been determined that the predetermined intervehicular distance between the host vehicle and the second other vehicle cannot be maintained.

5. A method for controlling a vehicle carried out by a vehicle control device, the method comprising:

determining whether or not a host vehicle is located in a blind spot zone of another vehicle based on information representing environment surrounding the host vehicle;

deciding to change speed of the host vehicle in a predetermined direction to initiate movement control to cause movement of the host vehicle from the blind spot zone of another vehicle to a location outside of the blind spot zone when it has been determined that the host vehicle is located in the blind spot zone of another vehicle;

determining whether or not an operation has been executed by a driver of the host vehicle to change the speed of the host vehicle in the opposite direction to the predetermined direction based on information representing operation by the driver, while the movement control is being executed; and ending the movement control when it has been determined that the operation has been executed by the driver to change the speed of the host vehicle, wherein the method further includes:

determining whether or not a predetermined intervehicular distance can be maintained between the host vehicle and a second other vehicle traveling in a traffic lane in which the host vehicle is traveling after the speed of the host vehicle has been changed by driver operation to move the host vehicle from the blind spot zone of the other vehicle to a location outside of the blind spot zone when it has been determined that the operation has been executed by the driver to change the speed of the host vehicle, and deciding to continue without ending the movement control when it has been determined that the predetermined intervehicular distance between the host vehicle and the second other vehicle cannot be maintained.

* * * * *